(12) United States Patent
Narayane

(10) Patent No.: US 10,254,098 B2
(45) Date of Patent: Apr. 9, 2019

(54) FLANGE CHECKING APPARATUS FOR PERFORMING ON-SITE FLANGE RUN-OUT CHECKS

(71) Applicant: Zamanath Flynn Ali, Port of Spain (TT)

(72) Inventor: Matthew Narayane, Port of Spain (TT)

(73) Assignee: Zamanath Flynn Ali, Port of Spain (TT)

( * ) Notice: Subject to any disclaimer, the term of this patent is extended or adjusted under 35 U.S.C. 154(b) by 127 days.

(21) Appl. No.: 15/665,101

(22) Filed: Jul. 31, 2017

(65) Prior Publication Data

US 2018/0031360 A1 Feb. 1, 2018

Related U.S. Application Data

(60) Provisional application No. 62/369,264, filed on Aug. 1, 2016.

(51) Int. Cl.
*G01B 5/00* (2006.01)
*G01B 5/28* (2006.01)

(52) U.S. Cl.
CPC ........... *G01B 5/0002* (2013.01); *G01B 5/285* (2013.01)

(58) Field of Classification Search
CPC ............................... G01B 5/002; G01B 5/285
USPC ....................................... 33/412, 529, 555.1
See application file for complete search history.

(56) References Cited

U.S. PATENT DOCUMENTS

| | | | | |
|---|---|---|---|---|
| 1,403,156 A | * | 1/1922 | Gonzalez | G01B 5/00 33/23.02 |
| 4,185,917 A | * | 1/1980 | Alsina | G01B 11/275 248/481 |
| 4,538,357 A | * | 9/1985 | Dressel | G01B 5/201 33/203.18 |
| 5,711,083 A | * | 1/1998 | Bidwell | G01B 5/08 33/543 |
| 8,997,365 B2 | * | 4/2015 | Alexander | G01B 5/25 33/645 |
| 2001/0029677 A1 | * | 10/2001 | Bidwell | G01B 5/0004 33/542 |
| 2007/0068016 A1 | * | 3/2007 | Stieff | G01B 11/2755 33/203.18 |
| 2013/0219733 A1 | * | 8/2013 | Smith | F01D 25/285 33/645 |
| 2015/0152648 A1 | * | 6/2015 | Amer | E04F 21/0076 33/527 |

* cited by examiner

*Primary Examiner* — George B Bennett

(57) ABSTRACT

A flange checking apparatus for performing on-site flange run-out checks on the flange surface includes a hub structure, a plurality of support legs, a measuring arm, and a transmission. The plurality of support legs mounted radially around a hub structure selectively fastens the flange checking apparatus adjacent to the flange. A measuring arm measures the flange surface for imperfections. A transmission transmits a rotational input to a rotational output which causes the measuring arm to rotate in a circular path over the flange surface. An adjustable clamp mounted terminally to a leg body of the plurality of support legs forms a friction bond with the flange. A surface variation indicator mounted terminally to the measuring arm travels over the flange and inspects microscopic variations on the flange surface. A guiding mechanism guides that measuring arm along a fixed circular path around the flange.

17 Claims, 7 Drawing Sheets

FLANGE CHECKING APPARATUS FOR PERFORMING ON-SITE FLANGE RUN-OUT CHECKS

The current application claims a priority to the U.S. Provisional Patent application Ser. No. 62/369,264 filed on Aug. 1, 2016.

FIELD OF THE INVENTION

The present invention generally relates to a flange checking apparatus for performing on-site flange run-out checks on the flange surface. In particular, a portable, cost-effective flange checking apparatus that can be easily mobilized and attached to a flange is disclosed.

BACKGROUND OF THE INVENTION

In many industrial applications such as in refineries, power generation facilities, petrochemical facilities and other general industries, on-site flange re-facing is an integral part of any plant turn-around or outage/shut down for many years.

Traditionally, the machining of large diameter flanges is done by very heavy and costly equipment operated by contractors. In many instances, the need to do actual machining is not always the case. In this regard, performing run-out checks on the flange-face surfaces to determine surface variations from original specification tolerances reveals that there is no need for machining. Oftentimes run-out checks find that flange completely undamaged with the source of the problem being unrelated to the flange, such as gasket failure. However, this is usually discovered too late after the contractor costs and significant plant equipment costs have already been incurred.

The present invention offers a quick and cost-effective alternative for performing run-out checks on flanges and determining the need for flange re-facing. Because of its compact size and ease of mobilization, the present invention can be operated by workers. Further, the present invention obviates the need for hiring a contractor and incurring other costs associated with mobilizing equipment to the facility.

The present invention weighs an estimated 150 pounds when fully extended to measure a 100-inch diameter flange. For measuring a 20-inch flange, the weight of the present invention is approximately 50 pounds. In comparison, a traditional flange re-facing machine in production today, capable of doing the same measurements on a 100-inch diameter flange weighs approximately 2000 pounds. As such, a heavy lifting equipment is required to mobilized conventional flange machines.

In contrast, the present invention can be disassembled and contained in 3 separate cases weighing 75 pounds each and can be mobilized by two people carrying the cases.

The present invention mounts unto the outside diameter of flanges, similar to the traditional outside diameter flange re-facing machine, with four contact points to the flange diameter (legs). There is an arm similar to a pointer with a surface variation indicator located at the end mounted in line with the face of the flange to be checked. This arm is mounted to a guide ring and bearing housing which can rotate 360 degrees to perform measurements on the flange face. A transmission takes a rotation input and transmit a rotational output which drives the measuring arm.

DETAILED DESCRIPTION OF THE INVENTION

All illustrations of the drawings are for the purpose of describing selected versions of the present invention and are not intended to limit the scope of the present invention.

Figure 1:
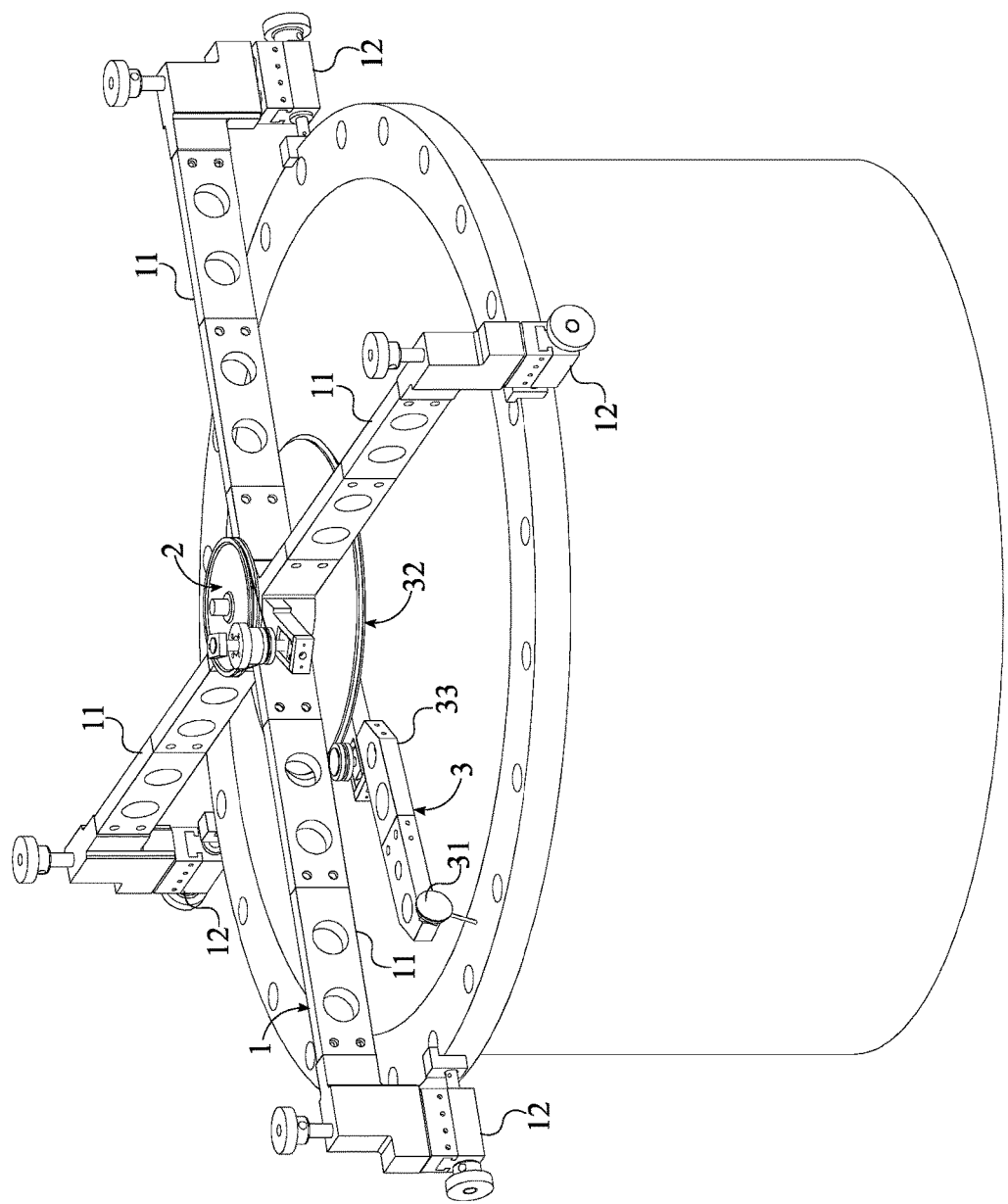
FIG. 1 is a front perspective view of the present invention with the plurality of support arms engaged on top of the flange.

A flange checking apparatus for flange resurfacing applications mounts onto the outer diameter of flanges and performs measurements of the flange surface. In reference to FIG. 1, the preferred embodiment of the present invention comprises a plurality of support legs 1, a transmission 2, a measuring arm 3, and a hub structure 4. The plurality of support legs 1 positions the hub structure 4 at the center of the flange, offset a certain distance from the surface of the flange. The hub structure 4 encloses the transfer shaft 21 and retains the transmission 2 and the guiding mechanism 32. Each of the plurality of support legs 1 comprises a leg body 11 and an adjustable clamp 12. The adjustable clamp 12 adjustably fastens the present invention onto flanges of various diameters. Moreover, the adjustable clamp 12 can also vary the offset distance between the hub structure 4 and the flange surface. The measuring arm 3 comprises an arm body 33, a surface variation indicator 31, and a guiding mechanism 32. The measuring arm 3 rotates over the flange and guides the surface variation indicator 31 over the flange surface. In the preferred implementation of the present invention, the measuring arm 3 rotates over the flange surface and employs the surface variation indicator 31 to measure the microscopic variations of the flange surface.

Figure 5:
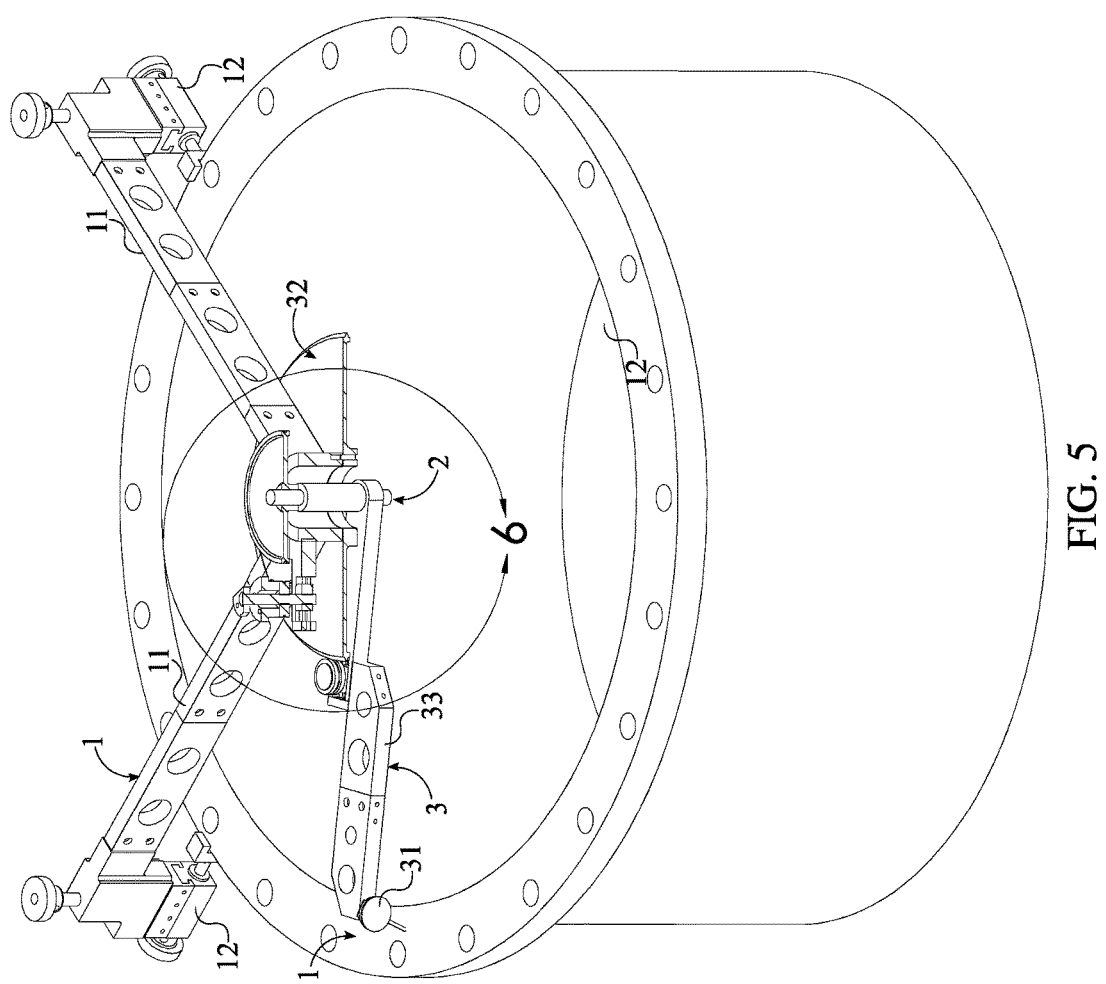
FIG. 5 is a perspective view to the present invention engaged to the flange, wherein a transversal cross section is taken through the hub structure and the guiding mechanism.
Figure 6A:
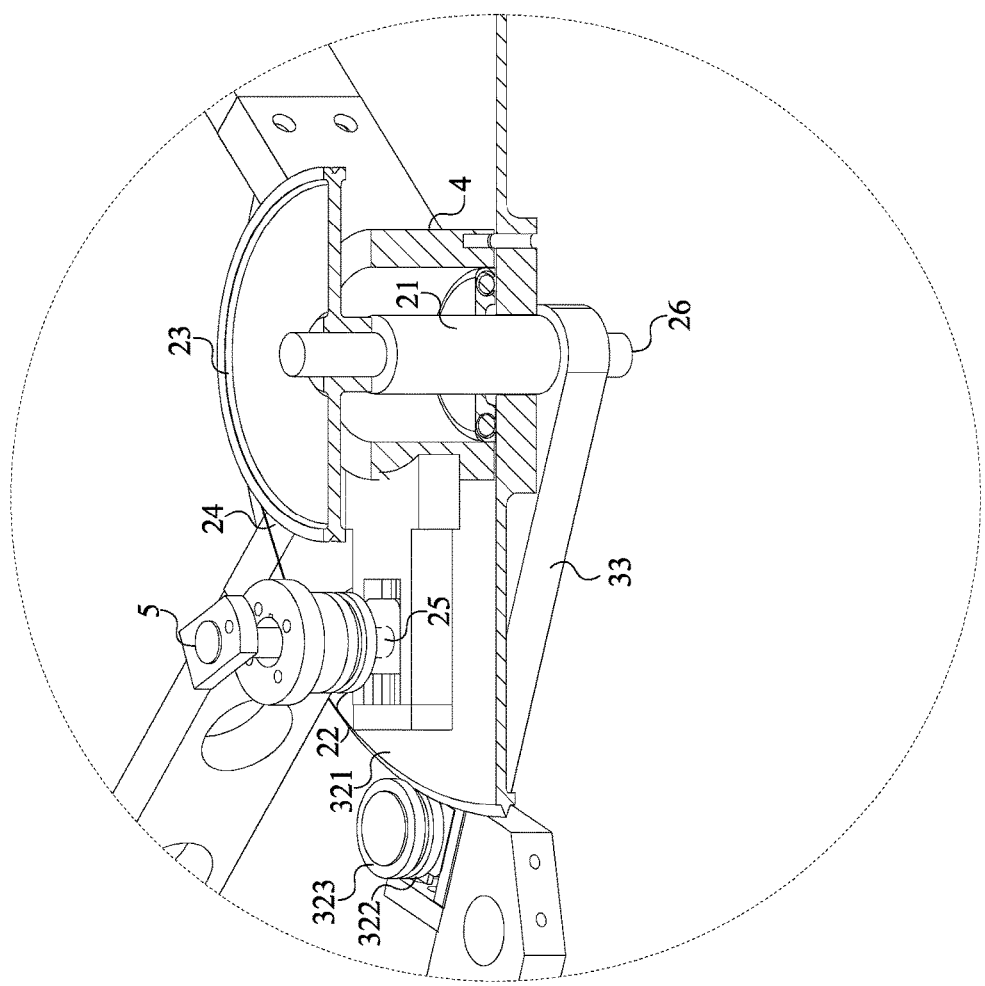
FIG. 6A is a detailed view of the present invention taken about circle 6 in FIG. 5, wherein the present invention is illustrated with a hand crank to drive the rotation of the measuring arm.
Figure 6B:
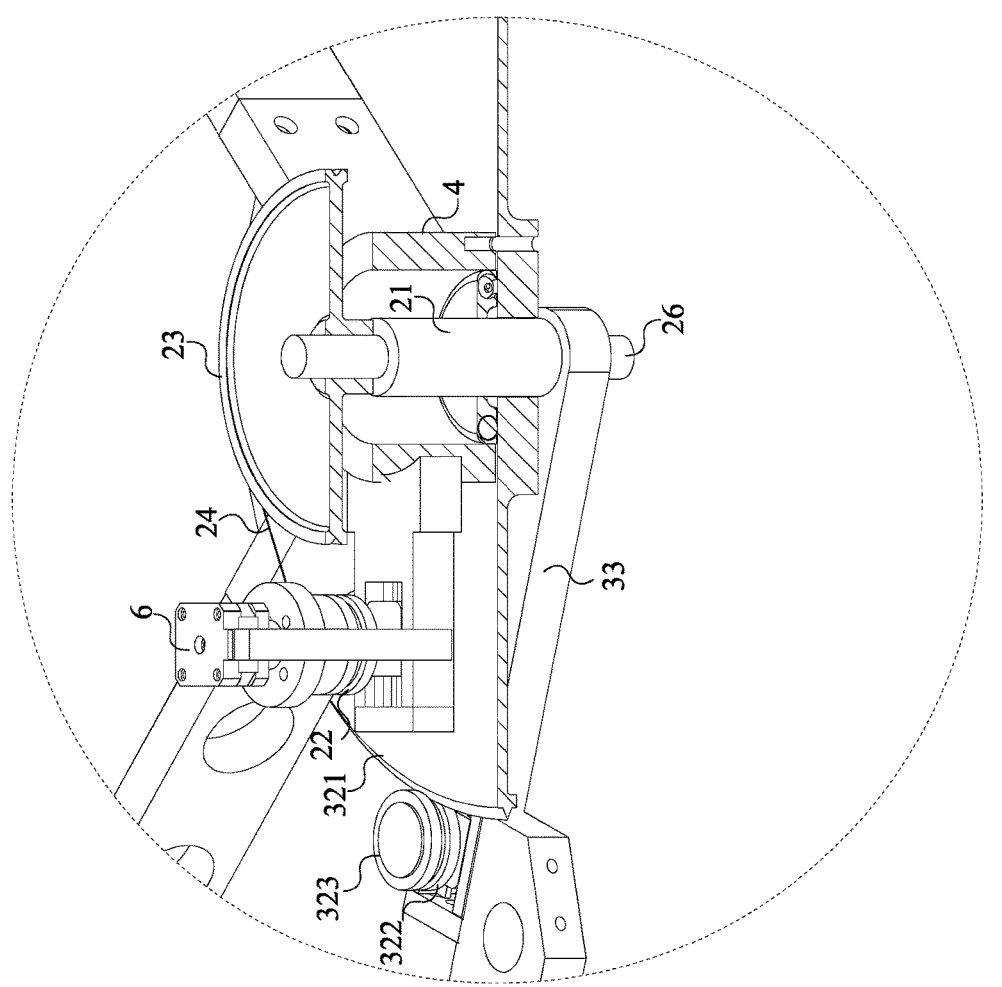
FIG. 6B is a detailed view of the present invention taken about circle 6 in FIG. 5, wherein the present invention is illustrated with a motor to drive the rotation of the measuring arm.

As can be seen in FIG. 5-6B, the plurality of support legs 1 is radially distributed around the hub structure 4. In the preferred implementation of the invention, each of the plurality of support legs 1 are positioned at 90-degree angles from each other. The hub structure 4 is terminally connected to the leg body 11. As a result, the hub structure 4 is positioned in the center of the plurality of support legs 1 and is evenly supported all the way around the hub structure 4. The adjustable clamp 12 is terminally connected to the leg body 11, opposite the hub structure 4. As such, the adjustable clamp 12 is placed adjacent to the lateral surface of the flange. The transmission 2 is mounted onto the hub structure 4. In the preferred implementation, the transmission 2 converts high rotational speed into the necessary torque that is required to rotate the measuring arm. A rotational output 26 of the transmission 2 is terminally and perpendicularly connected to the arm body 33. As such rotating a rotational input 25 of the transmission causes the measuring arm 3 to rotate over the flange surface.

Figure 2:
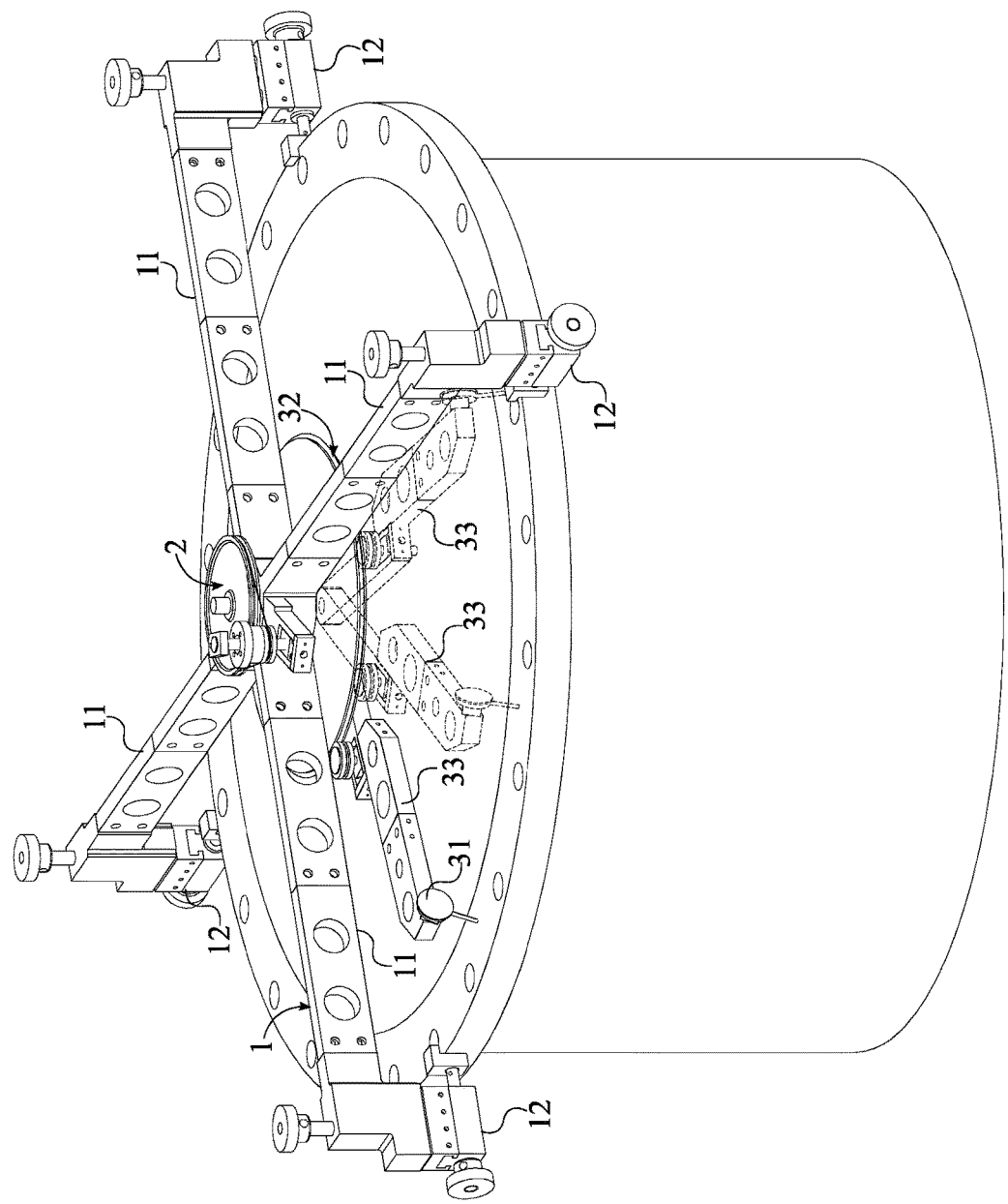
FIG. 2 is a front perspective view as shown in FIG. 1 with the measuring arm rotating in the preferred manner.

In reference to FIG. 2, the surface variation indicator 31 is terminally connected to the arm body 33, opposite the rotational output 26 of the transmission 2. Consequently, as the arm body 33 rotates, the surface variation indicator 31 travels in a narrow circular inspection path around the flange. This allows the surface variation indicator 31 to measure the microscopic variations and imperfections located on the inspection path. The preferred surface variation indicator 31 may comprise an analog dial connected to a sensor. The sensor amplifies minute variations on the flange surface and outputs the readings on the analog dial. In alternate embodiments of the present invention, a digital sensor such as a laser may output digital signals. The signals may be decoded and displayed as text on a screen. Additionally, the user can change the radial distance between the surface variation indicator 31 and the axis of rotation by selectively mounting the surface variation indicator 31 to one of 3 different hole placements placed ½ inch apart on the arm body 33. As such, the user may adjust the radial distance between the circular inspection path and the rotation axis by selecting one of the 3 different hole placements. The guiding mechanism 32 is operatively coupled in between the arm body 33 and the hub structure 4, wherein the guiding mechanism 32 is used to restrict rotation of the arm body 33. In particular, the guiding mechanism 32 ensures that the surface variation indicator 31 remains aligned to the proper inspection path.

Figure 4:
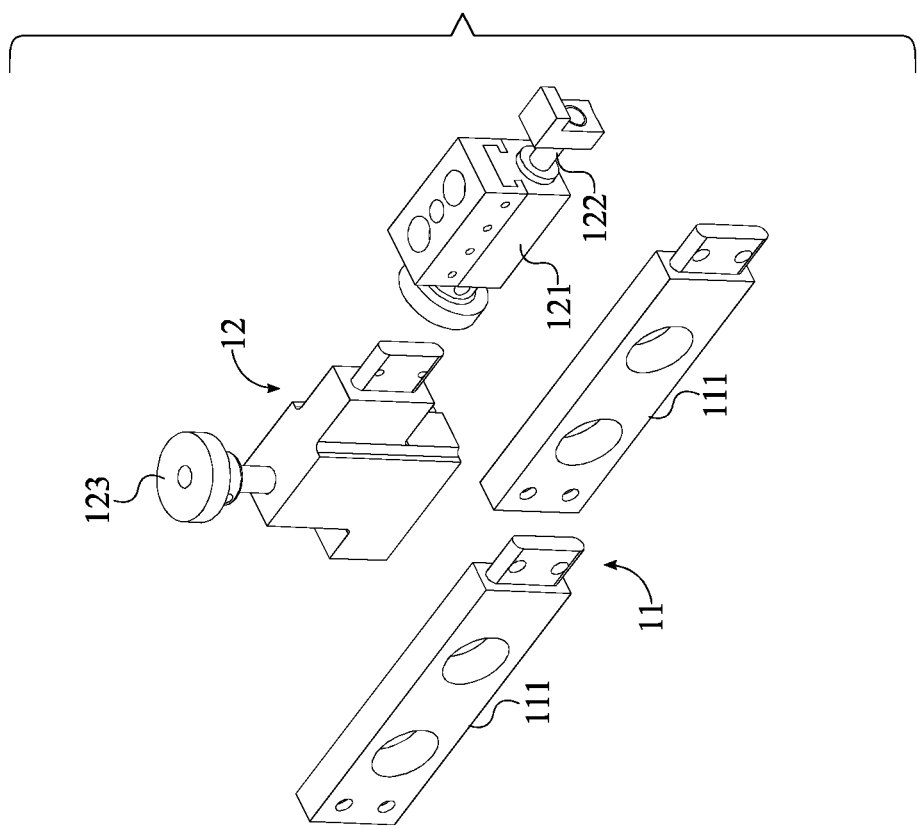
FIG. 4 is an exploded perspective view of the one of the plurality of support legs and the adjustable clamp.

In reference to FIG. 4, the leg body 11 may comprise a plurality of dismountable sections 111. The plurality of dismountable sections 111 is serially attached to each other to form the leg body 11. A user can change the length of each of the plurality of support legs 1 by dismounting one or more of the plurality of dismountable section 111. In the preferred embodiment, each of the plurality of dismountable sections 111 includes an interlocking joint. The interlocking joint has a male portion that interlocks into a female portion. Once engaged, fasteners are driven through the male portion and female portion which locks the male portion and the female portion together. In alternate embodiment, the interlocking joint can employ any other fastening mechanism that can create a selectively fastening engagement.

Referring once more to FIG. 5-6B, the transmission 2 may comprise a transfer shaft 21, a first pulley 22, a second pulley 23, a belt 24, and a rotational input 25. In the preferred implementation, rotational motion of the rotational input 25 is transferred through the second pulley 23, through the first pulley 22, through the transfer shaft 21, and out of the rotational output 26. The first pulley 22 and the second pulley 23 may be configured to exchange power for torque or via the belt. The transfer shaft 21 is rotatably mounted to the hub structure 4. The transfer shaft 21 exits from a hole at the bottom of the hub structure 4. A precision bearing concentrically mounted on the transfer shaft 21 minimizes the friction at the interface between the transfer shaft 21 and the hub structure 4. This allows the transfer shaft 21 to rotate freely within the hub structure 4. However, the precision bearing also allows the transfer shaft 21 to move in the lateral direction. As such, the guiding mechanism 32 is used as a physical barrier which prevents the transfer shaft 21 from moving in the lateral direction. This allows the transfer shaft 21 to transfer the rotational motion of the rotational input 25. A first end of the transfer shaft 21 is the rotational output 26. A second end of the transfer shaft 21 is torsionally connected to the first pulley 22. Consequently, this allows the rotational motion to transmit through the rotational input 25 and the second pulley 23 to the rotational output 26 of the first end of the transfer shaft 21.

Figure 3:
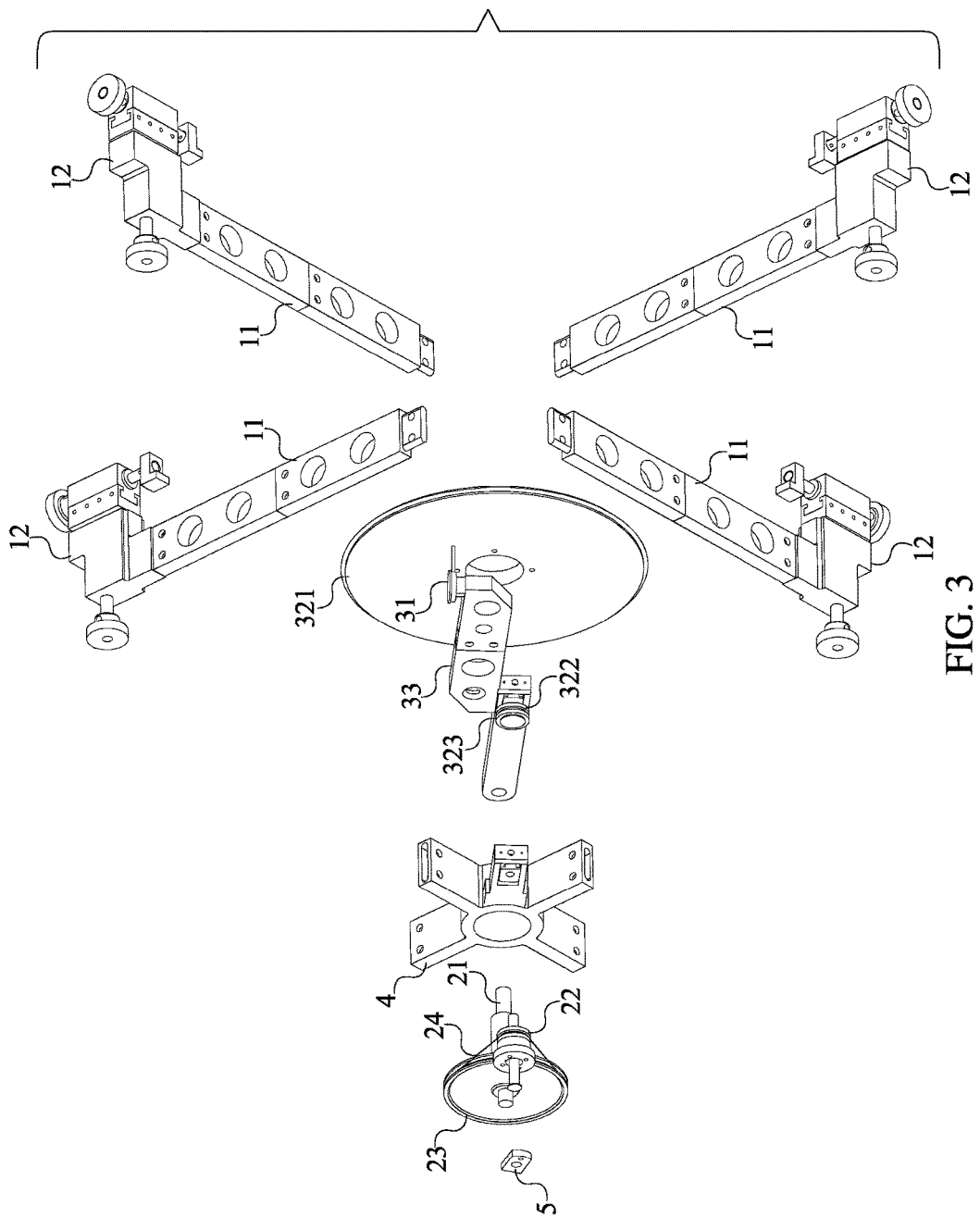
FIG. 3 is an exploded perspective view of the present invention.

In reference to FIG. 3, the second pulley 23 is rotatably mounted to the hub structure 4. In the preferred embodiment, a precision bearing permits the second pulley 23 to rotatably mount to the hub structure 4. The first pulley 22 and the second pulley 23 are torsionally tethered to each other by the belt 24. The belt 24 loops around both the first pulley 22 and the second pulley 23, which allows the transfer of rotational motion between the first pulley 22 and the second pulley 23. In particular, the belt 24 is retained in grooves cut into the lateral surfaces of the first pulley 22 and the second pulley 23. The rotational input 25 is torsionally connected to the second pulley 23. As such, the second pulley 23 allows the rotational input 25 to transfer rotational motion to the transmission 2. In the preferred embodiment, a hand crank 5 allows the user to rotate the rotational input 25. As such, the hand crank 5 is torsionally connected to the rotational input 25. Thus, the user may spin the hand crank to physically power the present invention. In addition, the hand crank 5 may be supplied with a handle which provides a gripping surface for the user.

In reference to FIG. 6B, in another embodiment of the present invention, a motor 6 is used to spin the rotational input 25. In this case, the rotor of the motor 6 is torsionally connected to the rotational input 25. The stator of the motor 6 is statically affixed to the hub structure 4. An electrical current is applied to the motor 6, which causes the rotor to spin in relation to the stator. The speed and torque of the motor 6 may be controlled by a user interface. The electrical current may be supplied through an internally housed power supply such as a battery or an external power source accessible through an outlet.

Referring once more to FIG. 6A, in the preferred implementation of the present invention, the transmission 2 is configured to receive a high-power lower-torque rotational motion from the rotational input 25 and to generate a low-power, high-torque rotational motion from the rotational output 26. The high-torque rotational motion of the rotational output 26 makes the surface variation indicator 31 resistant to disturbances encountered while traveling over the flange surface. Further, this ensures that the surface variation indicator 31 remains secure on the desired inspection path. In order to generate the high-torque rotational motion of the rotational output 26, a radius of the first pulley 22 is greater than a radius of the second pulley 23. As a result, the angular displacement of the rotational input 25 is higher than the angular displacement of the rotational output 26. This permits the user to precisely control the placement of the surface variation indicator 31.

Referring once more to FIG. 3, the precision bearing disposed between the transfer shaft 21 and the hub structure 4 can cause unwanted lateral motion. As such, the guiding mechanism 32 is used as a physical barrier which affixes the transfer shaft 21 in the centrally aligned position. The preferred embodiment of the guiding mechanism 32 comprises a circular brim 321 and a roller 322. In the preferred implementation, the circular brim 321 causes the roller 322 to travel in a circular path around the flange. The circular brim 321 is laterally connected around the hub structure 4. As such, the circular brim 321 is concentrically positioned around the hub structure 4 and flange. The roller 322 is rotatably connected to the arm body 33. This allows the roller 322 to travel smoothly over the circular brim 321, which minimizes frictional losses.

The roller 322 is laterally positioned along the arm body 33. In particular, the roller 322 is affixed close to the rotation axis of the measuring arm 3. This makes the measuring arm 3 more resistant to disturbance as lateral forces on the measuring arm 3 are transferred directly to the roller 322 and then to the circular brim 321. As previously mentioned, disturbances can cause the transfer shaft 21 to shift sideways. Additionally, the roller 322 and the circular brim 321 are tangentially engaged to each other. In particular, beveled edges of the circular brim 321 interlock with a groove cut into the lateral surface of the roller 322. The contact patch between the roller 322 and the circular brim 321 is very small in order to minimize rolling friction. Therefore, the roller 322 is allowed to travel smoothly over the circular brim 321 as the measuring arm 3 rotates.

Referring to FIG. 2 and FIG. 6A, the guiding mechanism 32 may comprise a stopper 323. The stopper 323 limits the rotational movement of the measuring arm 3 between the at least two of the plurality of support legs 1. In the preferred implementation, the stopper 323 is mounted adjacent to the roller 322. More specifically, the stopper 323 is mounted directly on top of the roller 322. The leg body 11 of each of the plurality of support legs 1 is coincidently positioned onto the circular brim 321, directly in the path of the circling stopper 323. Accordingly, the stopper 323 is mounted coplanar with the plurality of support legs 1. This results in the top portion of the roller 322 to be mounted above the bottom surface of the plurality of support legs 1. As a result, when the measuring arm 3 rotates, the stopper 323 contacts the lateral surface of the plurality of support legs 1, preventing the measuring arm 3 from traveling further. In the preferred implementation of the present invention, at least two of the plurality of support legs 1 divide the flange surface into section which can be inspected separately. In this case, the at least two of the plurality of support legs 1 forms boundaries which prevent the measuring arm 3 from traveling past the designated section. For example, a plurality of support legs 1 placed 90 degrees apart, could be used to divide the flange surface into 4 sections. In this case, the stopper 323 can be used to ensure that the surface variation indicator 31 and the measuring arm 3 remains inside the inspection path.

Referring once more to FIG. 4, the preferred embodiment of the adjustable clamp 12 comprises a press 122 and a radial adjustment mechanism 121. The press 122 presses against the outer rim of the flange, thereby creating a friction bond between the adjustable clamp 12 and the flange. An L-shaped extrusion positioned at the one end of the press 122, aligns the press 122 level to the flange surface. The strength of the friction bond is dependent on the normal force applied by the press 122 against the outer rim of the flange. As such, the adjustable clamp 12 allows the user to adjust the normal force of the press 122 by controlling the radial distance between the press 122 and the hub structure 4. More specifically, the press 122 is operatively coupled to the leg body 11 by the radial adjustment mechanism 121, wherein the radial adjustment mechanism 121 is used to adjust a radial distance between the press 122 and the hub structure 4. The press 122 is slidably positioned inside a circular slot positioned in the lower portion of the adjustable clamp 12. In order to change the radial distance, the user simply moves the press 122 inwards or outwards from the circular slot.

As can be seen in FIG. 4, the adjustable clamp 12 may comprise an offset adjustment mechanism 123. The offset adjustment mechanism 123 offsets the press 122 from the adjustable clamp 12, thereby changing the offset distance between the press 122 and the leg body 11. More specifically, the press 122 is operatively coupled to the leg body 11 by the offset adjustment mechanism 123, wherein the radial adjustment mechanism 121 is used to adjust a lateral offset distance between the press 122 and the leg body 11. In the preferred embodiment of the present invention, the offset adjustment mechanism 123 is contained in the upper portion of the adjustable clamp 12. The upper portion and the lower portion are connected by cylindrical shafts. A central shaft is slidably placed in the middle of the cylindrical shafts. The bottom portion of the central shaft is affixed to the lower portion. Thus, the central shaft can be used to move the top portion and the lower portion apart, thereby changing the offset distance between the press 122 and the leg body 11. This allows the user to adjust the distance between the flange surface and the surface variation indicator 31, which may be necessary is the inner portion of the flange surface is offset from the outer portion.

Although the invention has been explained in relation to its preferred embodiment, it is to be understood that many other possible modifications and variations can be made without departing from the spirit and scope of the invention as hereinafter claimed.

What is claimed is:

1. A flange checking apparatus comprises:
    a plurality of support legs;
    a transmission;
    a measuring arm;
    a hub structure;
    each of the plurality of support legs comprises a leg body and an adjustable clamp;
    the measuring arm comprises an arm body, a surface variation indicator, and a guiding mechanism;
    the plurality of support legs being radially distributed around the hub structure;
    the hub structure being terminally connected to the leg body;
    the adjustable clamp being terminally connected to the leg body, opposite the hub structure;
    the transmission being mounted onto the hub structure;
    a rotational output of the transmission being terminally and perpendicularly connected to the arm body;
    the surface variation indicator being terminally connected to the arm body, opposite the rotational output of the transmission; and
    the guiding mechanism being operatively coupled in between the arm body and the hub structure, wherein the guiding mechanism is used to restrict rotation of the arm body.

2. The flange checking apparatus as claimed in claim 1 comprises:
    the leg body comprises a plurality of dismountable sections; and
    the plurality of dismountable sections being serially attached to each other.

3. The flange checking apparatus as claimed in claim 1 comprises:
    the transmission further comprises a transfer shaft, a first pulley, a second pulley, a belt, and a rotational input;
    the transfer shaft being rotatably mounted to the hub structure;
    a first end of the transfer shaft being the rotational output;
    a second end of the transfer shaft being torsionally connected to the first pulley;
    the second pulley being rotatably mounted to the hub structure;
    the first pulley and the second pulley being torsionally tethered to each other by the belt; and
    the rotational input being torsionally connected to the second pulley.

4. The flange checking apparatus as claimed in claim 3 comprises:

a hand crank; and
the hand crank being torsionally connected to the rotational input.

5. The flange checking apparatus as claimed in claim 3 comprises:
a motor; and
the rotor of the motor being torsionally connected to the rotational input.

6. The flange checking apparatus as claimed in claim 3, wherein a radius of the first pulley is greater than a radius of the second pulley.

7. The flange checking apparatus as claimed in claim 1 comprises:
the guiding mechanism comprises a circular brim and a roller;
the circular brim being laterally connected around the hub structure;
the roller being rotatably connected to the arm body;
the roller being laterally positioned along the arm body; and
the roller and the circular brim being tangentially engaged to each other.

8. The flange checking apparatus as claimed in claim 7 comprises:
the guiding mechanism further comprises a stopper;
the leg body of each of the plurality of support legs being coincidently positioned onto the circular brim;
the stopper being mounted adjacent to the roller; and
the stopper being positioned coplanar with the plurality of support legs.

9. The flange checking apparatus as claimed in claim 1 comprises:
the adjustable clamp comprises a press and a radial adjustment mechanism; and
the press being operatively coupled to the leg body by the radial adjustment mechanism, wherein the radial adjustment mechanism is used to adjust a radial distance between the press and the hub structure.

10. The flange checking apparatus as claimed in claim 1 comprises:
the adjustable clamp comprises a press and an offset adjustment mechanism; and
the press being operatively coupled to the leg body by the offset adjustment mechanism, wherein the radial adjustment mechanism is used to adjust a lateral offset distance between the press and the leg body.

11. A flange checking apparatus comprises:
a plurality of support legs;
a transmission;
a measuring arm;
a hub structure;
each of the plurality of support legs comprises a leg body and an adjustable clamp;
the measuring arm comprises an arm body, a surface variation indicator, and a guiding mechanism;
the leg body comprises a plurality of dismountable sections;
the plurality of support legs being radially distributed around the hub structure;
the hub structure being terminally connected to the leg body;
the adjustable clamp being terminally connected to the leg body, opposite the hub structure;
the transmission being mounted onto the hub structure;
a rotational output of the transmission being terminally and perpendicularly connected to the arm body;
the surface variation indicator being terminally connected to the arm body, opposite the rotational output of the transmission;
the guiding mechanism being operatively coupled in between the arm body and the hub structure, wherein the guiding mechanism is used to restrict rotation of the arm body; and
the plurality of dismountable sections being serially attached to each other.

12. The flange checking apparatus as claimed in claim 11 comprises:
the transmission further comprises a transfer shaft, a first pulley, a second pulley, a belt, a hand crank, and a rotational input;
wherein a radius of the first pulley is greater than a radius of the second pulley;
the transfer shaft being rotatably mounted to the hub structure;
a first end of the transfer shaft being the rotational output;
a second end of the transfer shaft being torsionally connected to the first pulley;
the second pulley being rotatably mounted to the hub structure;
the first pulley and the second pulley being torsionally tethered to each other by the belt;
the rotational input being torsionally connected to the second pulley; and
the hand crank being torsionally connected to the rotational input.

13. The flange checking apparatus as claimed in claim 12 comprises:
a motor; and
the rotor of the motor being torsionally connected to the rotational input.

14. The flange checking apparatus as claimed in claim 11 comprises:
the guiding mechanism comprises a circular brim and a roller;
the circular brim being laterally connected around the hub structure;
the roller being rotatably connected to the arm body;
the roller being laterally positioned along the arm body; and
the roller and the circular brim being tangentially engaged to each other.

15. The flange checking apparatus as claimed in claim 14 comprises:
the guiding mechanism further comprises a stopper;
the leg body of each of the plurality of support legs being coincidently positioned onto the circular brim;
the stopper being mounted adjacent to the roller; and
the stopper being positioned coplanar with the plurality of support legs.

16. The flange checking apparatus as claimed in claim 11 comprises:
the adjustable clamp comprises a press and a radial adjustment mechanism; and
the press being operatively coupled to the leg body by the radial adjustment mechanism, wherein the radial adjustment mechanism is used to adjust a radial distance between the press and the hub structure.

17. The flange checking apparatus as claimed in claim 11 comprises:
the adjustable clamp comprises a press and an offset adjustment mechanism; and
the press being operatively coupled to the leg body by the offset adjustment mechanism, wherein the radial adjustment mechanism is used to adjust a lateral offset distance between the press and the leg body.

* * * * *